(12) United States Patent
Williams et al.

(10) Patent No.: US 10,306,468 B2
(45) Date of Patent: May 28, 2019

(54) INTERNET PROTOCOL MULTIMEDIA SYSTEM SESSION RESURRECTION

(71) Applicant: T-Mobile USA, Inc., Bellevue, WA (US)

(72) Inventors: Carl Williams, Maple Valley, WA (US); Ming Shan Kwok, Seattle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/196,930

(22) Filed: Jun. 29, 2016

(65) Prior Publication Data

US 2018/0007550 A1 Jan. 4, 2018

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0272* (2013.01); *H04L 63/06* (2013.01);
(Continued)

(58) Field of Classification Search
CPC ............. H04L 65/1016; H04L 65/1083; H04L 65/1006; H04L 65/1073; H04L 61/2592; H04L 67/14; H04L 67/141; H04L 63/0272; H04L 63/06; H04L 63/0876; H04L 65/105; H04L 65/1069; H04L 67/142; H04L 67/145; H04L 67/42; H04W 36/0011; H04W 36/0016; H04W 36/00; H04W 36/0005; H04W 36/0022; H04W 76/022; H04W 76/041; H04W 80/10; H04M 7/006
See application file for complete search history.

(56) References Cited

U.S. PATENT DOCUMENTS 9,503,963 B1* 11/2016 Hilyard ................ H04W 40/30
2004/0117657 A1 6/2004 Gabor et al.
(Continued)

OTHER PUBLICATIONS

PCT Search Report and Written Opinion dated Sep. 21, 2017 for PCT Application No. PCT/US17/37861, 11 pages.

*Primary Examiner* — Quoc Thai N Vu
(74) *Attorney, Agent, or Firm* — Lee & Hayes, P.C.

(57) ABSTRACT

The techniques described herein are configured to map a new security association to an active Internet Protocol (IP) Multimedia Subsystem (IMS) session subsequent to the occurrence of a connectivity interruption. In various examples, the connectivity interruption occurs in an access network that supports an IMS network. The new security association is established using an updated IP address that is configured for (e.g., assigned to) a mobile device after the connectivity interruption to the IMS session occurs. The techniques described herein improve network performance because less resources are spent to establish new IMS session in response to the interruption. Rather, in accordance with the examples provided herein, network components can determine that a new security association is associated with an active IMS session, and the network components can map the new security association to the active IMS session (e.g., one for which the IMS has not released the IMS bearer).

16 Claims, 4 Drawing Sheets

(51) Int. Cl.
*H04L 29/08* (2006.01)
*H04M 7/00* (2006.01)
*H04W 12/04* (2009.01)

(52) U.S. Cl.
CPC ........ *H04L 63/0876* (2013.01); *H04L 65/105* (2013.01); *H04L 65/1006* (2013.01); *H04L 65/1016* (2013.01); *H04L 65/1069* (2013.01); *H04L 67/142* (2013.01); *H04L 67/145* (2013.01); *H04L 67/42* (2013.01); *H04M 7/006* (2013.01); *H04W 12/04* (2013.01)

(56) References Cited

U.S. PATENT DOCUMENTS

| | | | |
|---|---|---|---|
| 2008/0092224 A1* | 4/2008 | Coulas | H04L 45/00 726/12 |
| 2009/0034534 A1 | 2/2009 | Faccin | |
| 2009/0313378 A1 | 12/2009 | Mahdi et al. | |
| 2011/0200013 A1* | 8/2011 | Cheng | H04W 36/0011 370/331 |
| 2014/0259127 A1 | 9/2014 | Shaw et al. | |
| 2015/0236898 A1* | 8/2015 | Bonnier | H04L 41/0668 370/218 |
| 2016/0269899 A1* | 9/2016 | Carames | H04L 63/029 |
| 2017/0251514 A1* | 8/2017 | Soderlund | H04L 61/2007 |

* cited by examiner

INTERNET PROTOCOL MULTIMEDIA SYSTEM SESSION RESURRECTION

BACKGROUND

The Internet Protocol (IP) Multimedia Subsystem (IMS), or IP Multimedia Core Network Subsystem, provides a framework for delivering IP multimedia services to devices. The wireless standards body 3rd Generation Partnership Project (3GPP) initially designed IMS to expand mobile networks beyond Global System for Mobile Communications (GSM) so that mobile networks could provide Internet services. For instance, 4G telecommunications technologies such as Long Term Evolution (LTE) (e.g., LTE Advanced, Evolved High-Speed Packet Access (HSPA+), etc.) can use IMS to deliver Internet services. Since then, multiple versions of, and/or updates to, IMS have been implemented by various entities so that IMS can be supported by various access networks and different communication technologies.

IMS uses Internet Engineering Task Force (IETF) protocols such as Session Initiation Protocol (SIP). Once attached to an access network such as LTE, a mobile device can initiate an IMS session (e.g., a VoLTE call) by requesting SIP registration from the IMS. During SIP registration, IMS requires the mobile device to establish a security association between the mobile device and the IMS (e.g., a Proxy Call Session Control Function (P-CSCF) server of the IMS) and/or an end-point device (e.g., a receiver device of the VoLTE call). A security association comprises security information (e.g., shared security attributes or "secrets") between two network entities to support secure communication. For instance, the security association can include attributes such as: a cryptographic algorithm and/or mode to be used, encryption keys, and/or and parameters for the data to be passed over the connection (e.g., IP addresses). Consequently, the security association defines security mechanisms that bind IP addresses used to establish an IMS session so that communications via the IMS session are secure.

A problem with various access networks and/or the "mobility" of mobile devices is that connectivity interruptions to IMS sessions can occur. That is, a mobile device can lose connectivity to an access network (e.g., lose a coverage signal based on a change in location). Moreover, a mobile device can switch from one access network (e.g., LTE) to another access network (e.g., Wi-Fi) due to a change in coverage and/or a change in location. When these connectivity interruptions occur, the previously established security association is lost and the IMS session is subsequently terminated, thereby causing an inconvenience to the user (e.g., the VoLTE call is dropped). Consequently, the user experience is frustrated because the user has to initiate another IMS session (e.g., make another VoLTE call to the same person/device).

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

The techniques described herein are configured to map a new security association to an active IMS session subsequent to the occurrence of a connectivity interruption to the IMS session. In various examples, the connectivity interruption occurs in an access network supporting IMS. The new security association is established using an updated IP address that is configured for (e.g., assigned to) a mobile device after the connectivity interruption to the IMS session occurs. A mobile device may be referred to herein as a user equipment (UE). The techniques described herein improve network performance because less network and/or device resources are spent establishing a new IMS session in response to the connectivity interruption. Rather, in accordance with the examples provided herein, network components can determine that a new security association is associated with an active IMS session being maintained by the IMS, and the network components can map the new security association to the active IMS session (e.g., an IMS session for which the IMS has not released the IMS bearer). The techniques described herein also improve the user experience because the user can automatically be re-connected to a previous IMS session (e.g., a VoLTE call) without having to re-establish a new IMS session.

As described above, a security association comprises information that enables two network devices to communicate securely. The information can include encryption algorithms, authentication mechanisms, and parameters for the data to be passed over the secure connection (e.g., IP addresses). The framework for establishing a security association is provided by the Internet Security Association and Key Management Protocol (e.g., the Internet Key Exchange (IKE) protocol such as IKEv2). Since a security association is established based on an IP address, the security association can be lost if the UE experiences an interruption that causes a loss of connectivity to an access network (e.g., loses a coverage signal based on a change in location, switches from one access network to another, etc.). Upon re-attachment or re-registration to an access network, the UE is often configured with a new IP address that is different than the previous IP address that was lost due to the connectivity interruption. Accordingly, a new security association must be established using the new IP address.

Previously, the UE was required to establish a new IMS session in response to a connectivity interruption. For instance, the UE may have experienced a dropped VoLTE call due to a change in location and/or a loss of radio access coverage. Accordingly, the access network typically releases the access network bearer and then the UE must expend resources to establish a new IMS session (e.g., make the same VoLTE call to continue the conversation). However, even though the UE loses connectivity (e.g., on the access network side), the initial IMS session is still active on the IMS network, at least for a period of time (e.g., four seconds, five seconds, etc.) until the access network instructs the IMS to also release the IMS bearer due to the connectivity interruption.

As described herein, network components are configured to map a new security association to an active IMS session subsequent to the occurrence of a connectivity interruption to the IMS session. Stated another way, the a previously established security association can be "updated" based on a new IP address associated with a UE that experienced a connectivity interruption. Consequently, the UE does not have to complete all the procedures required to establish a new IMS session.

Figure 1:
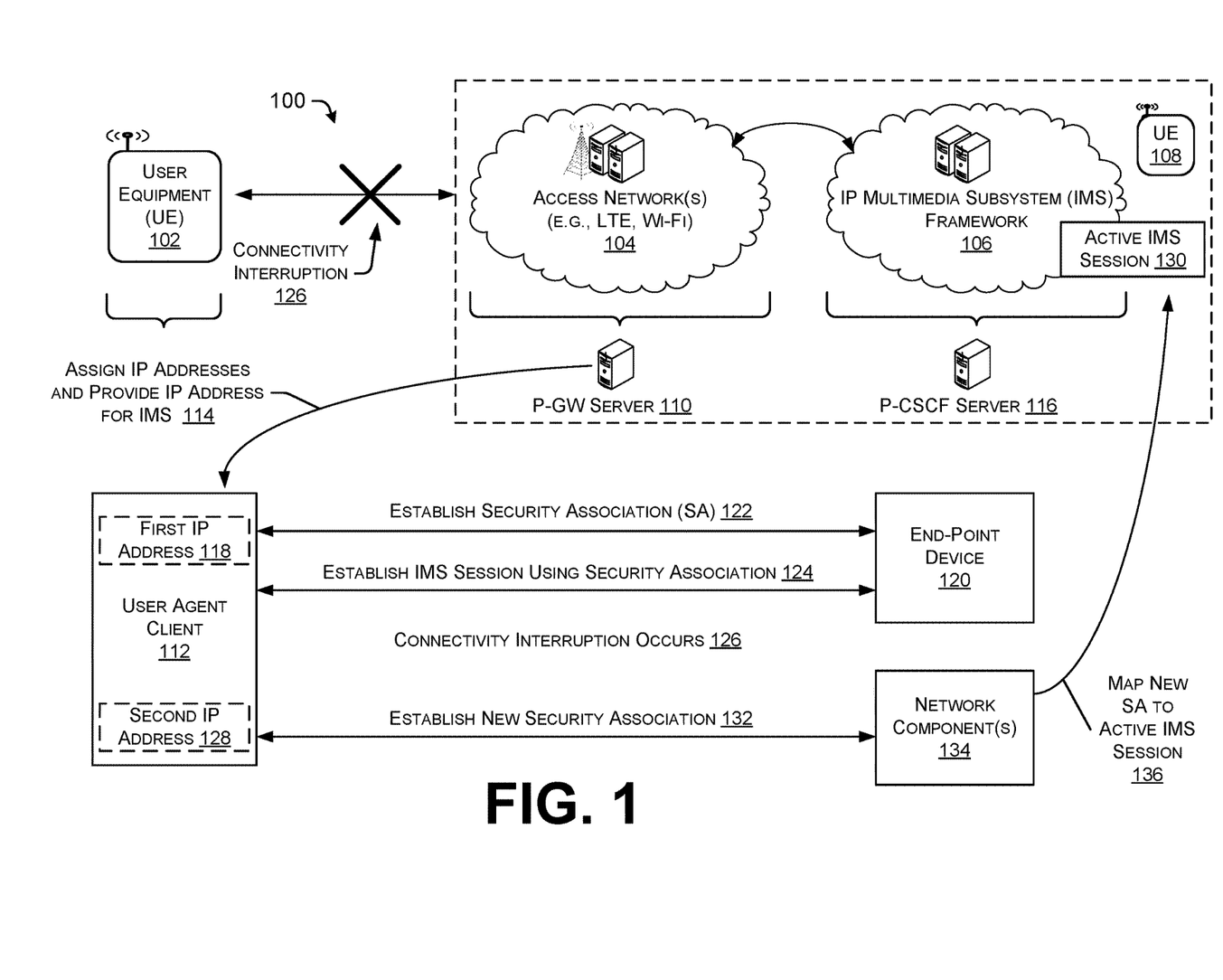
FIG. 1 depicts an illustrative environment in which a new security association can be mapped to an active IMS session subsequent to the occurrence of a connectivity interruption to the IMS session.

FIG. 1 depicts an illustrative environment 100 in which a new security association can be mapped to an active IMS session subsequent to the occurrence of a connectivity interruption to the IMS session.

In various implementations described herein, a UE 102 initiates an IMS session with an end-point device via an access network 104 that supports the IMS framework 106 (referred to herein as IMS 106 or an IMS network). The end-point device can comprise another UE 108 that receives a VoLTE call, for example. The IMS 106 can be supported by various types of access networks, such as fixed access networks (e.g., Digital Subscriber Line (DSL), cable modems, Ethernet, etc.), mobile access networks (e.g., LTE, W-CDMA, CDMA2000, etc.) and/or wireless access (e.g., WLAN, WiMAX, etc.).

The UE 102 can include, but is not limited to: a smartphone device, a cell phone device, a tablet computer device, a laptop computer device, a mobile hotspot device, a personal digital assistant (PDA) device, an electronic book device, a handheld gaming device, a personal media player device, or any other portable or mobile electronic device that may generate voice and/or digital data, request voice and/or digital data over an access network 104, receive voice and/or digital data over an access network 104, and/or exchange voice and/or digital data over an access network 104. Moreover, the UE 102 may operate in accordance with a service or a subscription plan offered by a commercial cellular service provider and purchased by a user of the UE 102. In various examples, the UE 102 includes user credentials (e.g., a Subscriber Identity Module (SIM), an IP Multimedia Service Identity Module (ISIM), Universal Mobile Telecommunications System Subscriber Identity Module (USIM), etc.) that enables the UE 102 (e.g., a user or subscriber associated with the UE) to be identified and authenticated.

The UE 102 attaches to an access network 104 (e.g., LTE, Wi-Fi, etc.). Attaching to the access network 104 can also be referred to as registering with the access network 104 (e.g., camping on an LTE network). For instance, upon power up or upon entrance into a coverage area, the UE 102 sends a request to attach to the access network 104. The request causes components of the access network 104 to establish a bearer for the UE 102, where the bearer is capable of offering, to the UE 102, a connection to the IMS 106. With respect to LTE, the bearer can comprise: a base station (e.g., an eNodeB), a Serving Gateway (S-GW) server, and/or a Packet Data Network Gateway (P-GW) server 110. To this end and in accordance with further examples discussed herein, an access network 104 can comprise a mobile telephone network (MTN) that includes components (e.g., devices, equipment, nodes, etc.) such as base stations (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate and/or route data between the UE 102 and the IMS 106. It is understood in the context of this document, that the techniques discussed herein may also or alternatively be implemented in association with other networking technologies as well, such as a wide area network (WAN), wireless local area network (WLAN), etc. Thus, other network components can comprise, for example: a Packet Data Gateway (PDG), Dynamic Host Control Protocol (DHCP), and Domain Name System (DNS).

The UE 102 comprises a user agent (UA) client 112 configured to handle multimedia communications for an application or device functionality (e.g., a client of network protocol used in communications between end-points). As referenced by 114, the P-GW server 110 or another network component is configured to assign IP addresses to the UA client 112. As further referenced by 114, the P-GW server 110 is also configured to provide the UA client 112 with information regarding how to connect to the IMS 106. For example, the P-GW server 110 can provide an IP address of a Proxy Call Session Control Function (P-CSCF) server 116 or another network component of the IMS 106. Accordingly, once attached to an access network 104, the UE 102 has an assigned IP address, such as the first IP address 118 in FIG. 1, and the UE 102 is aware of an IP address for the IMS 106 (e.g., an IP address for the P-CSCF server 116B) which is useable to establish an IMS session (e.g., a VoLTE call).

In various implementations, the UE 102 initiates the IMS session by requesting SIP registration from the IMS 106. The UA client 112 sends a first register message that allows the IMS 106 (e.g., an I-CSCF server and/or the S-CSCF server) to authenticate the UE 102 and/or a user of the UE 102, via retrieval of a subscriber profile from the home subscriber server (HSS). Then the IMS 106 returns a message (e.g., a 401 Unauthorized message) that includes a security challenge. In response to the security challenge, the UA client 112 produces and sends a second register message that contains credentials (e.g., the UE's SIM credentials). The credentials allow for a security association between the UE 102 and another end-point device 120 to be established via the IMS 106, as referenced by 122. For instance, the end-point device 120 can be the UE 108 receiving the VoLTE call from the UE 102. Components of the IMS 106, such as the P-CSCF server 118, help establish the security association between the UE 102 and the end-point device 120.

As described above, a security association comprises information that enables two network devices to communicate securely. The information can include encryption algorithms, authentication mechanisms, and parameters for the data to be passed over the secure connection (e.g., IP addresses). The framework for establishing a security association is provided by the Internet Security Association and Key Management Protocol (e.g., the Internet Key Exchange (IKE) protocol such as IKEv2). Accordingly, the security association established in association with reference 122 is based on the first IP address 118 (e.g., an IP address assigned to the UE 102 by the P-GW server 110).

After the security association is established, the UA client 112 is configured to use the security association to establish and secure an IMS session (e.g., in accordance with a SIP invite), as referenced by 124. In various examples, the security association comprises an Internet Protocol Security (IPsec) security association that enables secure Internet Protocol (IP) communications by authenticating and encrypting each IP packet of the IMS session. Accordingly, IPsec includes protocols for establishing mutual authentication between agents at the beginning of the IMS session and IPsec negotiates cryptographic keys to be used during the IMS session. Moreover, the IMS session can deliver audio and video over the access network 104 and the IMS 106 using the Real-Time Transport Protocol (RTP) or Internet Protocol version 6 (IPv6).

FIG. 1 further illustrates that, during the IMS session, a connectivity interruption occurs 126 (as illustrated by the "X" between the UE 102 and the access network 104). This interruption may temporarily disconnect the UE 102 from the access network 104 for a period of time (e.g., a few seconds). For example, the UE 102 may lose a coverage signal based on a change in location (e.g., entrance into a structure or the closing of an elevator door to move from one floor to another). Moreover, the UE 102 may switch from one type of access network 104 (e.g., LTE) to another type of access network 104 (e.g., Wi-Fi) due to a change in coverage (e.g., strength of an acquired signal) and/or a change in location (e.g., this may be referred to as a "handover").

Based on the connectivity interruption 126, the UA client 112 is configured with a second IP address 128 that is different than the first IP address 118. In one example, the second IP address 128 is assigned to the UA client 112 by the P-GW server 110. As described above, due to the connectivity interruption 126 and as a result of the second IP address 128, the UE 102 must establish a new security association.

However, even though the UE 102 has experienced the connectivity interruption 126 on the network access side of a secure connection (e.g., one side of an IPsec tunnel), the IMS session is still active on the IMS side of the secure connection (e.g., the opposite side of an IPsec tunnel). Accordingly, rather than having the access network 104 instruct the IMS 106 to release the IMS bearer due to the connectivity interruption 126 after a period of time has expired (e.g., four seconds, five seconds, etc.), the techniques described herein allow the IMS 106 to maintain the IMS bearer and keep the IMS session 130 active for an extended period of time (e.g., a threshold period of time such as ten seconds, twenty seconds, thirty seconds, forty seconds, and so forth). Stated another way, since the IMS side of the secure connection is still intact, the access network does not instruct the IMS 106 to release the IMS bearer and as a result, the IMS session is not dropped in the IMS 106.

Therefore, using the second IP address 128, the UA client 112 is configured to establish a new security association, as referenced by 132. The new security association is established by, or with, one or more network component(s) 134 (e.g., the P-GW server 110, the P-CSCF server 116, etc.). For instance, a network component 134 is configured to determine that the new security association is associated with the active IMS session 130, and therefore, the network component 134 maps the new security association (SA) to the active IMS session 130, as referenced by 136, so that communications can continue without the UE 102 having to (i) implement a complete new authentication exchange to establish a new SA with the end-point device 120 and/or (ii) establish a new IMS session (e.g., make a new VoLTE call). Stated another way, the network component 134 is configured to resurrect a previously interrupted IMS session by updating the initial security association with new parameters (e.g., the second IP address 128) that have changed due to a connectivity interruption 126 that occurs on only one side of the secure connection.

In various implementations, the network component 134 uses SIM credentials to determine that the UE 102 was a participant in a recent IMS session that was interrupted, yet is still active in the IMS 106 (e.g., the active IMS session 130). The network component 134 can use a SIP re-invite to resurrect the IMS session by mapping (e.g., matching) the SIM credentials of the new security association with the SIM credentials used to establish the initial security association and the IMS session that has since been interrupted, yet is still active. Consequently, via the techniques provided herein, the UE 102 is provided with an opportunity to re-register with, and re-connect to, an access network to continue an active IMS session 130 rather than start a new IMS session.

In some instances, a network component 134 is configured to inform the UE 102 of the status of the re-connection and/or resurrection. That is, the network component 134 can cause the UE 102 to display a status notification so a user is aware that the UE 102, the access network 104, and/or the IMS 106 are in the process of resurrecting the IMS session (e.g., a VoLTE call). For example, the UE 102 can display a message that indicates "RECONNECTING" along with a count-down timer until the reconnection and resurrection attempt is abandoned. In various implementation, the count-down timer is configured in association with a pre-defined period of time allowed for reconnection and resurrection (e.g., twenty seconds, thirty seconds, forty seconds, etc.).

Figure 2:
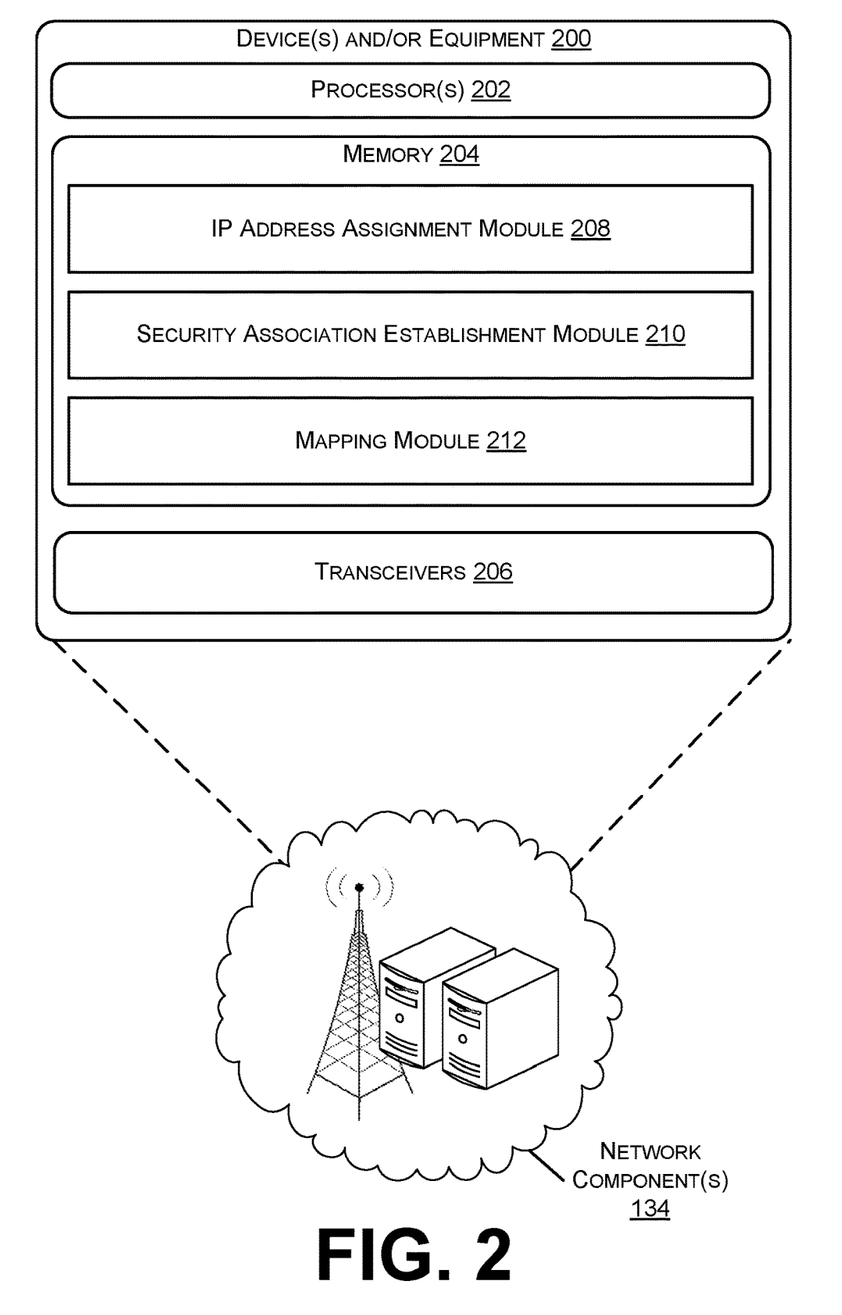
FIG. 2 depicts example details of network component(s) that are configured to establish an IMS session for a mobile device and map a new security association to an active IMS session subsequent to the occurrence of a connectivity interruption to the IMS session.

FIG. 2 depicts example details of network component(s) 134 that are configured to establish an IMS session for the UE 102 and map a new security association to an active IMS session subsequent to the occurrence of a connectivity interruption to the IMS session. The network component(s) 134 comprise device(s) (e.g., servers) and/or other equipment 200 configured within an access network 104 and/or the IMS 106.

A device can include one or more processor(s) 202 and memory 204. The device or equipment associated with the device can include transceivers 206 (e.g., antennas). Processor(s) 202 may include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 202 may be configured to fetch and execute computer-readable instructions stored in the memory 204.

The memory 204 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transmission mechanism.

The memory 204 can include one or more of: an IP address assignment module 208, a security association establishment module 210, and/or a mapping module 212. As used herein, the term "module" is intended to represent example divisions of executable instructions for purposes of discussion, and is not intended to represent any type of requirement or required method, manner or organization. Accordingly, while various "modules" are discussed herein with respect to FIG. 2, their functionality and/or similar functionality could be arranged differently and/or across a number of devices (e.g., combined into a fewer number of modules, broken into a larger number of modules, etc.). Further, while certain functions and modules may be described herein as being implemented by software and/or firmware executable on a processor, in other embodiments, any or all of the modules may be implemented in whole or in part by hardware (e.g., a specialized processing unit, etc.) to execute the described functions.

The IP address assignment module 208 is configured to assign an IP address, or issue an IP address, to the UE 102. For example, the IP address assignment module 208 can be implemented in a P-GW server 110, or alternatively, a DHCP server, and the IP address assignment module 208 can assign the first IP address 118 and/or the second IP address 128 to the UE 102 (e.g. the user agent client 112 of the UE 102). The assignment of an IP address may be implemented in accordance with movement of the UE 102 (e.g., in and out of radio access coverage areas, a switch from access network to another, etc.).

The security association establishment module 210 is configured to help establish security associations for the UE 102. A security association comprises information that enables two network devices to communicate securely. The information can include encryption algorithms, authentication mechanisms (e.g., based on UE credentials such as SIM credentials), and parameters for the data to be passed over the secure connection (e.g., IP addresses). In various examples, the security association establishment module 210 uses the Internet Security Association and Key Management Protocol (e.g., the Internet Key Exchange (IKE) protocol such as IKEv2) to establish a security association.

The mapping module 212 is configured to determine that credentials used to establish a new security association match credentials used to establish a security association that was lost (e.g., due to a connectivity interruption 126). Consequently, the mapping module 212 is configured to determine that the UE 102 was a participant in a recent IMS session that was interrupted, and the mapping module 212 discovers that the IMS session is still active in the IMS 106 (e.g., the active IMS session 130). Subsequently, the mapping module 212 can use a SIP re-invite to resurrect the IMS session by reconnecting the UE 102 to the active IMS session 130, and enabling secure communications based on the new security association.

Figure 3:
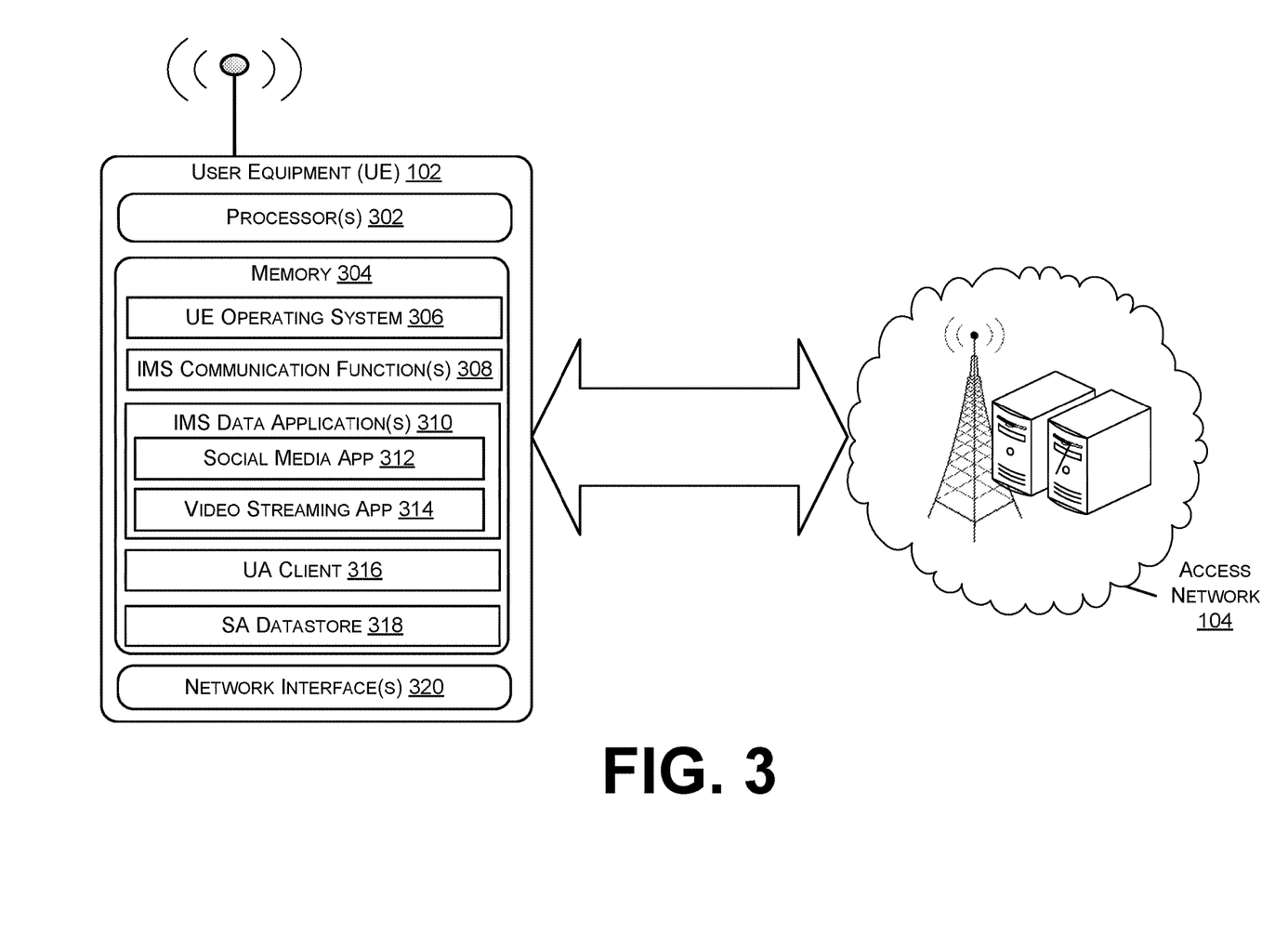
FIG. 3 depicts example components of a mobile device (e.g., a user equipment or UE) that is configured to establish a security association useable to conduct an IMS session.

FIG. 3 depicts example components of a mobile device, such as UE 102, that is configured to establish a security association useable to conduct an IMS session. For example, the UE 102 may include one or more processor(s) 302 and memory 304. Various types of processor(s) 302 and memory 304 are discussed above with respect to the processor(s) and the memory of FIG. 2. The memory 304 of the UE 102 can include an operating system (OS) 306, which is configured to manage hardware and services within and coupled to the UE 102 for the benefit of other modules or components.

The memory 304 may also store module(s) associated with IMS communication function(s) 308 (e.g., VoLTE voice of video calls, RCS messaging, etc.). Additionally, the memory 304 may include IMS data application(s) 310. For example, the IMS data applications 310 may include, but are not limited to, a social media application 312 and/or a video streaming application 314. Other types of applications can also be configured to perform IMS communications.

The UE 102 can also comprise the user agent client 316, as described above with respect to FIG. 1, as well as a security association datastore 318 and one or more network interface(s) 320. The security association datastore 318 is configured to store information useable to establish a security association (e.g., SIM credentials). A network interface 320 is configured to register the UE 102 with an access network 104, for example. For instance, a network interface 320 can be a transceiver configured to receive reference signals broadcast from antennas of an access network 104 and use control channel information in the reference signals to camp on a cell. The network interface 320 can handle communication exchanges via a secure IMS session, as discussed herein.

Figure 4:
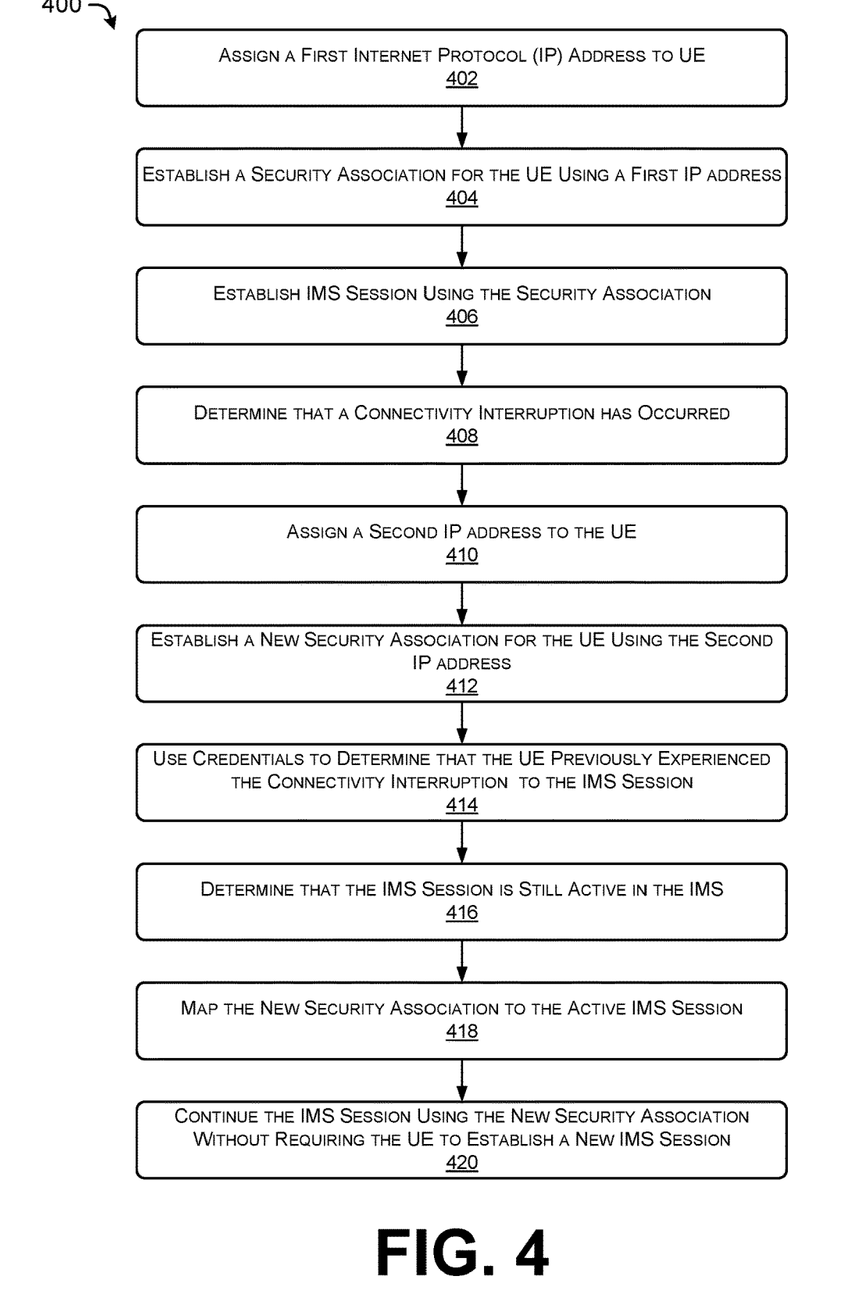
FIG. 4 is a flow chart of an example process for establishing an IMS session for a mobile device and mapping a new security association to an active IMS session subsequent to the occurrence of a connectivity interruption to the IMS session.

FIG. 4 presents an illustrative process illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process in FIG. 4 can be implemented in association with the description of any one or more of FIGS. 1-3.

FIG. 4 is a flow chart of an example process 400 for establishing an IMS session for a UE and mapping a new security association to an active IMS session subsequent to the occurrence of a connectivity interruption to the IMS session. The example process 400 may be performed by the components (e.g., the modules) of the devices and equipment 200 illustrated in FIG. 2, and implemented in the environment described with respect to FIG. 1. However, the example process 400 may be performed by other devices, and in other environments, as well.

At 402, a first IP address is assigned to a UE. For example, the UE 102 may register with an access network 104, and as a result, the IP address assignment module 208 of a network component such as the PG-W server 110 may assign the first IP address 118 to the UE 102.

At 404, a security association is established for the UE using the first IP address. As an example, in response to initiation of an IMS session by the UE 102 (e.g., via SIP registration), the security association establishment module 210 of a network component 134 (e.g., an I-CSCF server of the IMS 106 and/or a S-CSCF server of the IMS 106) authenticates the UE 102 via retrieval of a subscriber profile from the home subscriber server (HSS). Then the security association establishment module 210 returns a message (e.g., a 401 Unauthorized message) that includes a security challenge. Once the UE 102 provides a second register message that contains credentials (e.g., the UE's SIM credentials), the security association establishment module 210 establishes a security association between the UE 102 and an end-point device 120 (e.g., another UE 108 that is receiving a VoLTE call).

At 406, an IMS session is established using the security association. For instance, the UA client 112 of the UE 102 and/or network components 134 are configured to use the security association to establish a secure IMS session (e.g., in accordance with a SIP invite). In various examples, the secure IMS session comprises a VoLTE call to another UE 108 over the access network 104 and the IMS 106.

At 408, it is determined that a connectivity interruption has occurred. For example, network components 134 of the access network 104 can determine that the UE 102 is no longer registered and/or connected to the access network 104. This can be due to a loss of coverage (e.g., the inability for the UE 102 to receive a signal from an antenna of the access network 104). Or, this can be due to a switch from one access network (e.g., LTE) to another (e.g., Wi-Fi), which can also be referred to as a handover.

At 410, a second IP address is assigned to the UE. For example, upon re-entry into a coverage area, the UE 102 may re-register with an access network 104. Or, the UE 102 may implement a new registration via a different access network (e.g., Wi-Fi). As a result, the IP address assignment module 208 of a network component may assign the second IP address 128 to the UE 102.

At 412, a new security association is established for the UE using the second IP address. For instance, based on the connectivity interruption, the UA client 112 has to re-submit its credentials so that the new security association can be established by the security association establishment module 210 using the second IP address 128.

At 414, the credentials are used to determine that the UE previously experienced a connectivity interruption to the IMS session. For instance, the mapping module 212 of a network component 134 of the access network 104 and/or the IMS 106 can maintain a log of IMS sessions and determine that the UE was a participant in a recent IMS session (e.g., occurring in the last 30 seconds or the last minute).

At 416, it is determined that the IMS session is still active in the IMS. That is, the mapping module 212 can access a log of active IMS sessions and determine that an IMS session to which the UE 102 was previously a participant is still active. In various implementations, an active IMS session is one in which a bearer (e.g., an IMS bearer) is still in place and has not been released (e.g., by an instruction from the access network 104, by intentional termination of the IMS session by the UE, and so forth). Thus, an active IMS session can be associated with a communication tunnel (e.g., an IPsec tunnel) that was interrupted, and not intentionally ended by a participant to a VoLTE call, for example.

At 418, the new security association is mapped to the active IMS session. As described above, the mapping module 212 can use the credentials (e.g., SIM credentials) provided by the UE to map the new security association to the active IMS session.

At 420, the IMS session is continued (e.g., resurrected) using the new security association without requiring the UE to establish a new IMS session.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more devices comprising:
one or more processors; and
memory storing instructions that, when executed by the one or more processors, cause the one or more devices to:
  establish a security association for a mobile device using a first Internet Protocol (IP) address associated with the mobile device;
  establish an IP Multimedia Subsystem (IMS) session for the mobile device using the security association, the IMS session enabling secure network communications between the mobile device and an end-point device over an access network and an IMS network;
  responsive to a connectivity interruption that disables the secure network communications between the mobile device and the end-point device via the IMS session, receive credentials from the mobile device;
  establish a new security association for the mobile device using a second IP address associated with the mobile device and the credentials received from the mobile device;
  use the credentials received from the mobile device to determine that the mobile device was a participant in the IMS session prior to the connectivity interruption and that the IMS session is an active IMS session in the IMS network, wherein the credentials comprise subscriber identity module (SIM) credentials; and
  associate the new security association with the active IMS session by using a SIP re-invite to map the SIM credentials of the new security association with initial credentials used to establish the security association and the IMS session so that the mobile device is capable of continuing the secure network communications with the end-point device without having to establish a new IMS session.

2. The one or more devices of claim 1, wherein the security association comprises an encryption algorithm, an authentication mechanism, and one or more parameters for data to be securely communicated via the IMS session.

3. The one or more devices of claim 1, wherein the connectivity interruption is caused by one of (i) a loss of coverage by the access network or (ii) a switch from the access network to another access network.

4. The one or more devices of claim 1, wherein the instructions further cause the one or more devices to maintain the IMS session as the active IMS session in the IMS network for a predetermined period of time after the connectivity interruption occurs, the predetermined period of time being more than ten seconds.

5. The one or more devices of claim 1, wherein the instructions further cause the one or more devices to provide, to the mobile device, an IP address of a Proxy Call Session Control Function (P-CSCF) server so that the mobile device can establish the IMS session.

6. The one or more devices of claim 1, wherein the IMS session comprises a voice over LTE (VoLTE) call.

7. The one or more devices of claim 1, wherein the IMS session is establishing using Session Initiation Protocol (SIP).

8. The one or more devices of claim 1, wherein the instructions further comprise storing a log of IMS sessions and wherein determining that the mobile device was a participant in the IMS session prior to connectivity interruption comprises accessing the log of IMS sessions.

9. A method comprising:
assigning, by one or more network devices, a first Internet Protocol (IP) address to a mobile device;
establishing, by the one or more network devices, a security association for the mobile device using the first IP address;
establishing, by the one or more network devices, an IP Multimedia Subsystem (IMS) session for the mobile device using the security association, the IMS session enabling secure network communications between the mobile device and an end-point device over an access network and an IMS network;
responsive to a connectivity interruption that disables the secure network communications between the mobile device and the end-point device via the IMS session, receiving credentials from the mobile device;
establishing, by the one or more network devices, a new security association for the mobile device using a second IP address associated with the mobile device and the credentials received from the mobile device, wherein the credentials comprise subscriber identity module (SIM) credentials; and
using a SIP re-invite to map the SIM credentials of the new security association with initial credentials used to establish the security association and the IMS session so that the mobile device is capable of continuing the secure network communications with the end-point device without having to establish a new IMS session.

10. The method of claim 9, wherein the security association comprises an encryption algorithm, an authentication mechanism, and one or more parameters for data to be securely communicated via the IMS session.

11. The method of claim 9, wherein the connectivity interruption is caused by one of (i) a loss of coverage by the access network or (ii) a switch from the access network to another access network.

12. The method of claim 9, further comprising maintaining the IMS session as an active IMS session in the IMS network for a predetermined period of time after the connectivity interruption occurs, the predetermined period of time being more than ten seconds.

13. The method of claim 9, wherein establishing a new security association comprises updating the security association with the second IP address.

14. One or more non-transitory computer storage media comprising instructions that, when executed by one or more processors, cause one or more network components to perform operations comprising:
establishing a security association for a mobile device using a first Internet Protocol (IP) address associated with the mobile device;
establishing an IP Multimedia Subsystem (IMS) session for the mobile device using the security association, the IMS session enabling secure network communications between the mobile device and an end-point device over an access network and an IMS network;
responsive to a connectivity interruption that disables the secure network communications between the mobile device and the end-point device via the IMS session, receiving credentials from the mobile device;
establishing a new security association for the mobile device using a second IP address associated with the mobile device and the credentials received from the mobile device, wherein the credentials comprise subscriber identity module (SIM) credentials; and
using the credentials to establish a new security association for the mobile device and a second IP address associated with the mobile device;
determining that the IMS session is still active subsequent to establishing the new security association for the mobile device and the second IP address associated with the mobile device; and
using a SIP re-invite to map the SIM credentials of the new security association with initial credentials used to establish the security association and the IMS session so that the mobile device is capable of continuing the secure network communications with the end-point device without having to establish a new IMS session.

15. The one or more non-transitory computer storage media of claim 14, wherein the connectivity interruption is caused by one of (i) a loss of coverage by the access network or (ii) a switch from the access network to another access network.

16. The one or more non-transitory computer storage media of claim 14, wherein the operations further comprise maintaining the IMS session as an active IMS session in the IMS network for a predetermined period of time after the connectivity interruption occurs, the predetermined period of time being more than ten seconds.

* * * * *